(12) United States Patent
Mac Ewen et al.

(10) Patent No.: US 9,234,449 B2
(45) Date of Patent: Jan. 12, 2016

(54) LEAK AND BLOCKAGE DIAGNOSTIC SYSTEMS AND METHODS

(71) Applicant: GM GLOBAL TECHNOLOGY OPERATIONS LLC, Detroit, MI (US)

(72) Inventors: Ian J. Mac Ewen, White Lake, MI (US); Steven Ward Majors, Howell, MI (US); Eric Russell Clark, II, Lansing, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 405 days.

(21) Appl. No.: 13/741,615

(22) Filed: Jan. 15, 2013

(65) Prior Publication Data

US 2014/0114551 A1    Apr. 24, 2014

Related U.S. Application Data

(60) Provisional application No. 61/716,055, filed on Oct. 19, 2012.

(51) Int. Cl.
| | |
|---|---|
| *F01N 3/05* | (2006.01) |
| *F01N 11/00* | (2006.01) |
| *F01N 3/32* | (2006.01) |
| *F02B 77/08* | (2006.01) |

(52) U.S. Cl.
CPC ........ *F01N 11/00* (2013.01); *F01N 3/32* (2013.01); *F01N 2550/14* (2013.01); *F01N 2900/1804* (2013.01); *F02B 77/088* (2013.01)

(58) Field of Classification Search
CPC .............. F01N 3/22–3/227; F01N 2550/02; F01N 2560/025; F02D 41/1441; F02D 41/1454; F02D 41/1456; F02D 41/182

USPC ............ 60/304–306, 289, 274; 123/699–700; 701/102

See application file for complete search history.

(56) References Cited

U.S. PATENT DOCUMENTS

| | | | | |
|---|---|---|---|---|
| 6,164,270 A | * | 12/2000 | Bidner | ............... F02D 21/08 123/568.16 |
| 6,830,043 B2 | * | 12/2004 | Morinaga et al. | ............. 123/698 |
| 6,871,136 B1 | | 3/2005 | Wang et al. | |
| 6,966,177 B2 | | 11/2005 | Koyama et al. | |
| 7,111,454 B2 | | 9/2006 | Fulcher et al. | |
| 7,770,382 B2 | * | 8/2010 | Kondo | ................ F01N 3/22 60/276 |
| 8,136,347 B2 | | 3/2012 | Mac Ewen et al. | |
| 2004/0011027 A1 | * | 1/2004 | Hirooka et al. | ............. 60/289 |
| 2004/0177605 A1 | | 9/2004 | Kojima et al. | |
| 2005/0076634 A1 | | 4/2005 | Anilovich et al. | |
| 2010/0281966 A1 | * | 11/2010 | Cinpinski et al. | ......... 73/114.25 |

\* cited by examiner

*Primary Examiner* — Hung Q Nguyen
*Assistant Examiner* — Josh Campbell

(57) ABSTRACT

A diagnostic system for a vehicle is disclosed. A first difference module generates a first difference based on a first pressure measured at a first secondary air injection (SAI) valve and a previous value of the first pressure. A first summer module generates a first accumulated difference based on a sum of values of the first difference generated during a predetermined period. A second difference module generates a second difference based on a second pressure measured at a second SAI valve and a previous value of the second pressure. A second summer module generates a second accumulated difference based on a sum of values of the second difference generated during the predetermined period. A fault indication module selectively indicates that a fault is present downstream of one of the first and second SAI valves based on the first and second accumulated differences.

15 Claims, 4 Drawing Sheets

LEAK AND BLOCKAGE DIAGNOSTIC SYSTEMS AND METHODS

CROSS-REFERENCE TO RELATED APPLICATIONS

This application claims the benefit of U.S. Provisional Application No. 61/716,055, filed on Oct. 19, 2012. The disclosure of the above application is incorporated herein by reference in its entirety.

FIELD

The present disclosure relates to internal combustion engines and more particularly to diagnostic systems and methods for vehicles with two secondary air injection valves.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts an air/fuel mixture to generate drive torque for a vehicle. The air is drawn into the engine through a throttle valve and an intake manifold. The fuel is provided by one or more fuel injectors. The air/fuel mixture is combusted within one or more cylinders of the engine. Combustion of the air/fuel mixture may be initiated by, for example, injection of the fuel and/or spark provided by a spark plug. Combustion of the air/fuel mixture produces exhaust gas. The exhaust gas is expelled from the cylinders to an exhaust system.

The exhaust system includes a catalyst (e.g., three-way catalytic converter) that reacts with various components of the exhaust gas. The catalyst, however, may be unable to react when the temperature of the catalyst is less than a predetermined light-off temperature. Accordingly, the catalyst's reaction capability may be limited shortly after engine startup (e.g., key ON), when the catalyst temperature is likely less than the predetermined light-off temperature.

An engine control module (ECM) controls the torque output of the engine. For example only, the ECM controls the torque output of the engine based on driver inputs and/or other inputs. The ECM also controls various engine parameters to warm the catalyst when the catalyst temperature is less than the predetermined light-off temperature. For example only, the ECM may retard the spark timing to provide hydrocarbons in the exhaust gas. Oxidation of hydrocarbons in the exhaust system produces heat, which warms the catalyst.

The amount of heat produced via hydrocarbon oxidation is limited by the amount of oxygen in the exhaust system. A secondary air pump may pump air directly into a cylinder head. The air delivered by the secondary air pump increases the amount of oxygen in the exhaust system. The ECM controls operation of the secondary air pump to control oxidation of hydrocarbons in the exhaust system and warm the catalyst.

SUMMARY

A diagnostic system for a vehicle includes first and second difference modules, first and second summer modules, and a fault indication module. The first difference module generates a first difference based on a first pressure measured at a first secondary air injection (SAI) valve and a previous value of the first pressure. The first summer module generates a first accumulated difference based on a sum of values of the first difference generated during a predetermined period. The second difference module generates a second difference based on a second pressure measured at a second SAI valve and a previous value of the second pressure. The second summer module generates a second accumulated difference based on a sum of values of the second difference generated during the predetermined period. The fault indication module selectively indicates that a fault is present downstream of one of the first and second SAI valves based on the first and second accumulated differences.

In other features, the diagnostic system further includes: a first averaging module that generates a first average of the values of the first difference generated during the predetermined period; and a second averaging module that generates a second average of the values of the second difference generated during the predetermined period, and the fault indication module selectively indicates that the fault is present based on the first and second averages.

In still other features, the fault indication module selectively indicates that the fault is present based on a difference between the first and second averages.

In further features, the fault indication module selectively indicates that the fault is present based on the difference between the first and second averages divided by a greater one of the first and second averages.

In still further features, the fault indication module selectively indicates that the fault is present based on a first value that is equal to one plus a second value that is equal the difference between the first and second averages divided by a greater one of the first and second averages.

In other features, the fault indication module indicates that the fault is present when one of: (i) the first value is less than a third value equal to one minus a first predetermined amount; and (ii) the first value is greater than a fourth value equal to one plus a second predetermined value.

In still other features, the fault indication module indicates that the fault is not present when the first value is between the third and fourth values.

In further features, the fault indication module selectively indicates that the fault is present based on an absolute value of a difference between the first and second averages.

In other features, a system includes: the diagnostic system; the first and second SAI valves; and a SAI pump that pumps ambient air into an exhaust system of an engine via the first and second SAI valves.

In still other features, the diagnostic system further includes a monitoring module that illuminates a malfunction indicator lamp when the fault indication module indicates that the fault is present.

A diagnostic method includes: generating a first difference based on a first pressure measured at a first secondary air injection (SAI) valve and a previous value of the first pressure; generating a first accumulated difference based on a sum of values of the first difference generated during a predetermined period; generating a second difference based on a second pressure measured at a second SAI valve and a previous value of the second pressure; generating a second accumulated difference based on a sum of values of the second difference generated during the predetermined period; and selectively indicating that a fault is present downstream of one of the first and second SAI valves based on the first and second accumulated differences.

In other features, the diagnostic method further includes: generating a first average of the values of the first difference generated during the predetermined period; generating a second average of the values of the second difference generated during the predetermined period; and selectively indicating that the fault is present based on the first and second averages.

In still other features, the diagnostic method further includes selectively indicating that the fault is present based on a difference between the first and second averages.

In further features, the diagnostic method further includes selectively indicating that the fault is present based on the difference between the first and second averages divided by a greater one of the first and second averages.

In still further features, the diagnostic method further includes selectively indicating that the fault is present based on a first value that is equal to one plus a second value that is equal the difference between the first and second averages divided by a greater one of the first and second averages.

In other features, the diagnostic method further includes indicating that the fault is present when one of: (i) the first value is less than a third value equal to one minus a first predetermined amount; and (ii) the first value is greater than a fourth value equal to one plus a second predetermined value.

In still other features, the diagnostic method further includes indicating that the fault is not present when the first value is between the third and fourth values.

In further features, the diagnostic method further includes selectively indicating that the fault is present based on an absolute value of a difference between the first and second averages.

In still further features, the diagnostic method further includes triggering an SAI pump to pump ambient air into an exhaust system of an engine via the first and second SAI valves.

In further features, the diagnostic method further includes illuminating a malfunction indicator lamp in response to an indication that the fault is present.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Combustion of an air/fuel mixture within an engine produces exhaust that includes hydrocarbons, carbon oxides, nitrogen oxides, water, and other byproducts. A catalyst reacts with components of the exhaust before the exhaust is expelled from the vehicle. For example, the catalyst oxidizes hydrocarbons in the exhaust.

The catalyst's ability to oxidize hydrocarbons may be limited by the amount of oxygen in the exhaust. A secondary air injection (SAI) pump pumps ambient air into the exhaust, upstream of the catalyst. The additional oxygen provided by the SAI pump increases the catalyst's ability to oxidize hydrocarbons.

The SAI pump pumps ambient air into the exhaust through first and second SAI valves. First and second pressure sensors measure pressure at the first and second SAI valves. The pressures measured by the first and second pressure sensors may change as the engine expels exhaust from its cylinders.

A control module (e.g., an engine control module) according to the present disclosure determines first changes in the pressure measured by the first pressure sensor during a predetermined period and generates a first difference based on the first changes. The control module also determines second changes in the pressure measured by the second pressure sensor during the predetermined period and generates a second difference based on the second changes. The control module selectively diagnoses a fault downstream of one of the first and second SAI valves based on the first and second differences.

Figure 1A:
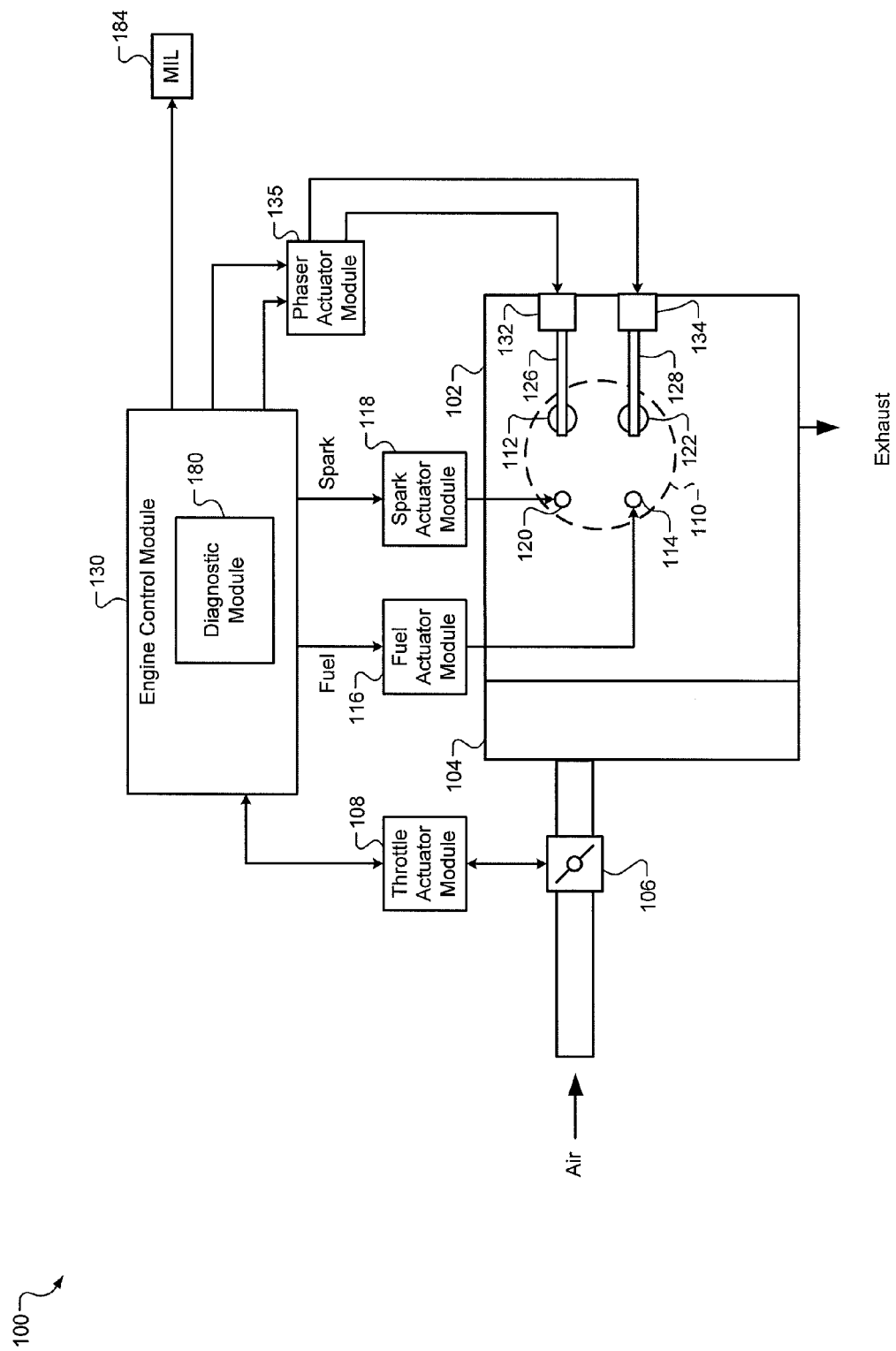
FIGS. 1A-1B include a functional block diagram of an engine system according to the present disclosure.
Figure 1B:
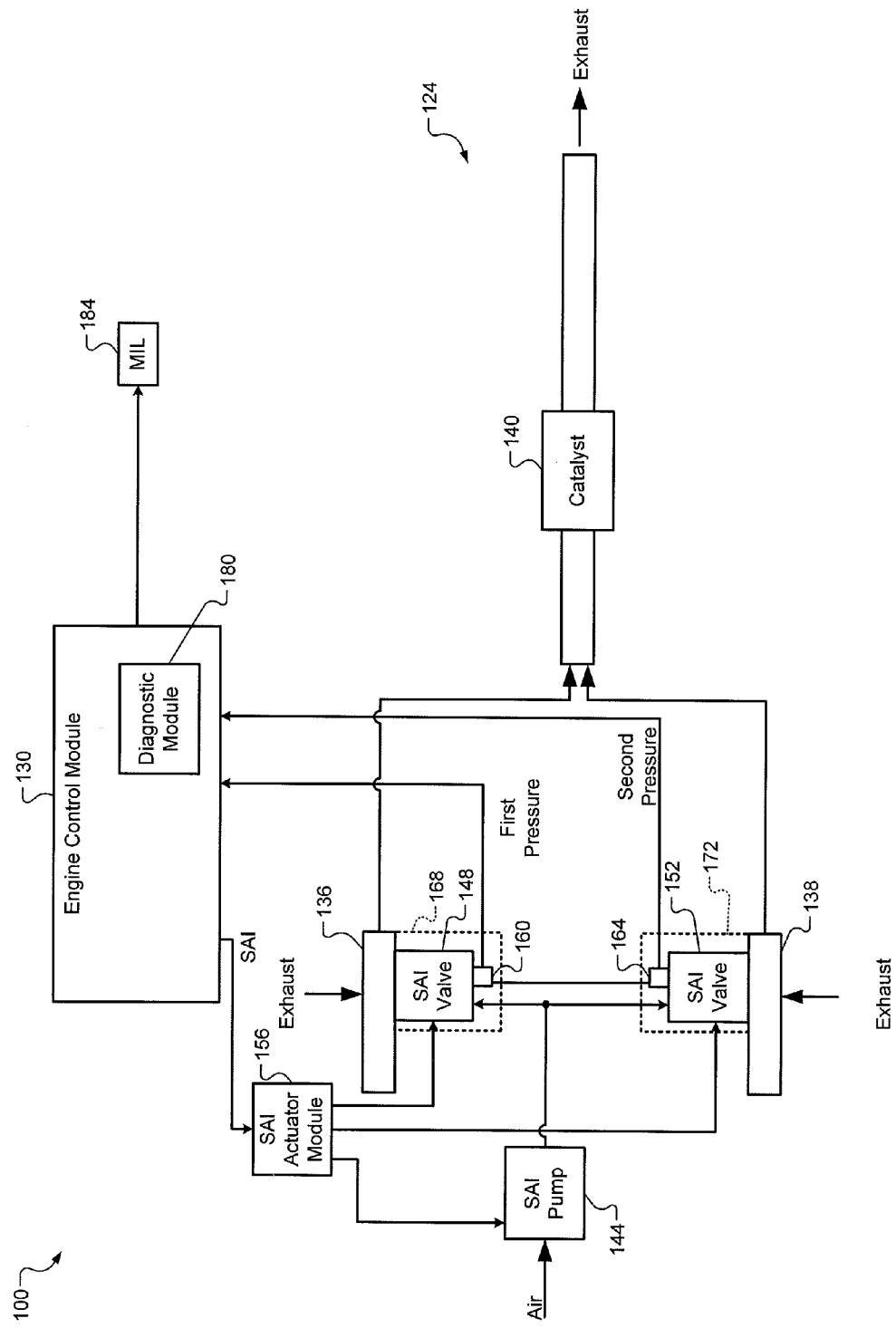

Referring now to FIG. 1A-1B, a functional block diagram of an example engine system 100 is presented. The engine system 100 includes an engine 102 that combusts an air/fuel mixture to produce drive torque. Air is drawn into an intake manifold 104 through a throttle valve 106. A throttle actuator module 108 controls opening of the throttle valve 106 and, therefore, airflow into the engine 102.

Air from the intake manifold 104 is drawn into cylinders of the engine 102. While the engine 102 may include multiple cylinders, for purposes of illustration, only a single representative cylinder 110 is shown. For example only, the engine 102 may include 1, 2, 3, 4, 5, 6, 8, 10, and/or 12 cylinders. Air from the intake manifold 104 is drawn into the cylinder 110 through an associated intake valve 112.

An engine control module (ECM) 130 controls the amount (e.g., mass) of fuel injected by a fuel injector 114 and the timing of the injection of fuel. More specifically, a fuel actuator module 116 controls opening of the fuel injector 114 based on signals from the ECM 130. The fuel injector 114 may inject fuel directly into the cylinder 110 as shown in FIG. 1A. In other implementations, the fuel injector 114 may inject fuel into the intake manifold 104 at a central location or may inject fuel into the intake manifold 104 at multiple locations, such as near the intake valve of each of the cylinders.

The injected fuel mixes with the air and creates the air/fuel mixture. The piston rises within the cylinder 110 and compresses the air/fuel mixture within the cylinder 110. Based upon signals from the ECM 130, a spark actuator module 118 energizes a spark plug 120, which initiates combustion of the air/fuel mixture. In other engine systems, the spark plug 120 may not be necessary to initiate combustion. The spark timing may be specified relative to the time when the piston is at its topmost position, referred to as to top dead center (TDC), the point at which the air/fuel mixture is most compressed.

Combustion of the air/fuel mixture drives the piston down, and the piston rotatably drives a crankshaft (not shown). The piston drives the crankshaft down until the piston reaches a bottom most position, referred to as to bottom dead center (BDC). The piston then begins moving up again and expels the byproducts of combustion through an exhaust valve 122 associated with the cylinder 110. The byproducts of combustion are exhausted from the vehicle via an exhaust system 124 (see FIG. 1B).

The intake valve 112 is controlled by an intake camshaft 126, and the exhaust valve 122 is controlled by an exhaust camshaft 128. In other implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

An intake cam phaser 132 controls the intake camshaft 126 and, therefore, controls opening (e.g., lift, timing, and duration) of the intake valve 112. An exhaust cam phaser 134 controls the exhaust camshaft 128 and, therefore, controls opening (e.g., lift, timing, and duration) of the exhaust valve 122. A phaser actuator module 135 controls the intake cam phaser 132 and the exhaust cam phaser 134 based on signals from the ECM 130. While camshaft-based intake and exhaust valve control systems are shown and discussed, camless intake and/or exhaust valve actuation may be used.

Referring to FIG. 1B, exhaust output by the engine 102 is provided to the exhaust system 124. The cylinders of the engine 102 may be arranged in one cylinder bank, two cylinder banks, or a greater number of cylinder banks. Each bank of cylinders outputs exhaust to an exhaust manifold (also referred to as a header or a cylinder head). For example, where the cylinders of the engine 102 are arranged in two cylinder banks, one of the cylinder banks outputs exhaust to a first exhaust manifold 136, and the other one of the cylinder banks outputs exhaust to a second exhaust manifold 138. Engines having a single cylinder bank may output exhaust to one exhaust manifold.

Typically, the exhaust flows from the exhaust manifold(s) to a catalyst 140, such as a three-way catalyst or an oxidation catalyst. The catalyst 140 reacts with various components of the exhaust to reduce the amount of those components in the exhaust. For example, the catalyst 140 oxidizes hydrocarbons in the exhaust.

A secondary air injection (SAI) pump 144 pumps ambient air into the exhaust system 124, upstream of the catalyst 140. The air delivered by the SAI pump 144 may be drawn from, for example, a location between the throttle valve 106 and an air filter (not shown).

The SAI pump 144 pumps air into the exhaust system 124 via first and second SAI valves 148 and 152. An SAI actuator module 156 controls whether the SAI pump 144 is ON or OFF based on signals from the ECM 130. The SAI actuator module 156 may also control whether the first and second SAI valves 148 and 152 are open or closed based on signals from the ECM 130.

A first pressure sensor 160 measures a first pressure at the first SAI valve 148. For example, the first pressure sensor 160 may be located upstream of where the first SAI valve 148 opens and closes. A second pressure sensor 164 measures a second pressure at the second SAI valve 152. For example, the second pressure sensor 164 may be located upstream of where the second SAI valve 152 opens and closes. In various implementations, the first pressure sensor 160 and the first SAI valve 148 may be implemented together as an SAI valve/sensor unit 168, and the second pressure sensor 164 and the second SAI valve 152 may be implemented together as an SAI valve/sensor unit 172.

While pressure sensors located upstream of where the associated SAI valve opens and closes are discussed, the pressure sensors may be located downstream of where the associated SAI valve opens and closes in various implementations. Additionally, while an engine system having two exhaust manifolds (the first and second exhaust manifolds 136 and 138) is shown, the present application is also applicable to engine systems with a single exhaust manifold, two SAI valves, and two pressure sensors.

The amount of heat produced in the exhaust system 124 via hydrocarbon oxidation is limited by the amount of oxygen in the exhaust system 124. The air delivered by the SAI pump 144 increases the amount of oxygen in the exhaust system 124 and, therefore, increases heat production capability via hydrocarbon oxidation.

Referring again to FIG. 1A, the ECM 130 regulates the torque output of the engine 102 based on driver inputs and other inputs. The driver inputs may include, for example, accelerator pedal position, brake pedal position, cruise control inputs, and/or other suitable driver inputs. The other inputs may include, for example, inputs from various sensors and/or inputs from other modules (not shown), such as a transmission control module, a hybrid control module, and a chassis control module.

The ECM 130 includes a diagnostic module 180 that determines and indicates whether a leak or a blockage is present downstream of one of the first and second SAI valves 148 and 152. The diagnostic module 180 determines whether a leak or a blockage is present based on the first and second pressures measured by the first and second pressure sensors 160 and 164. When a leak or a blockage is present, the diagnostic module 180 initiates one or more remedial actions, such as illumination of a malfunction indicator lamp (MIL) 184 and/or one or more other suitable remedial actions.

Figure 2:
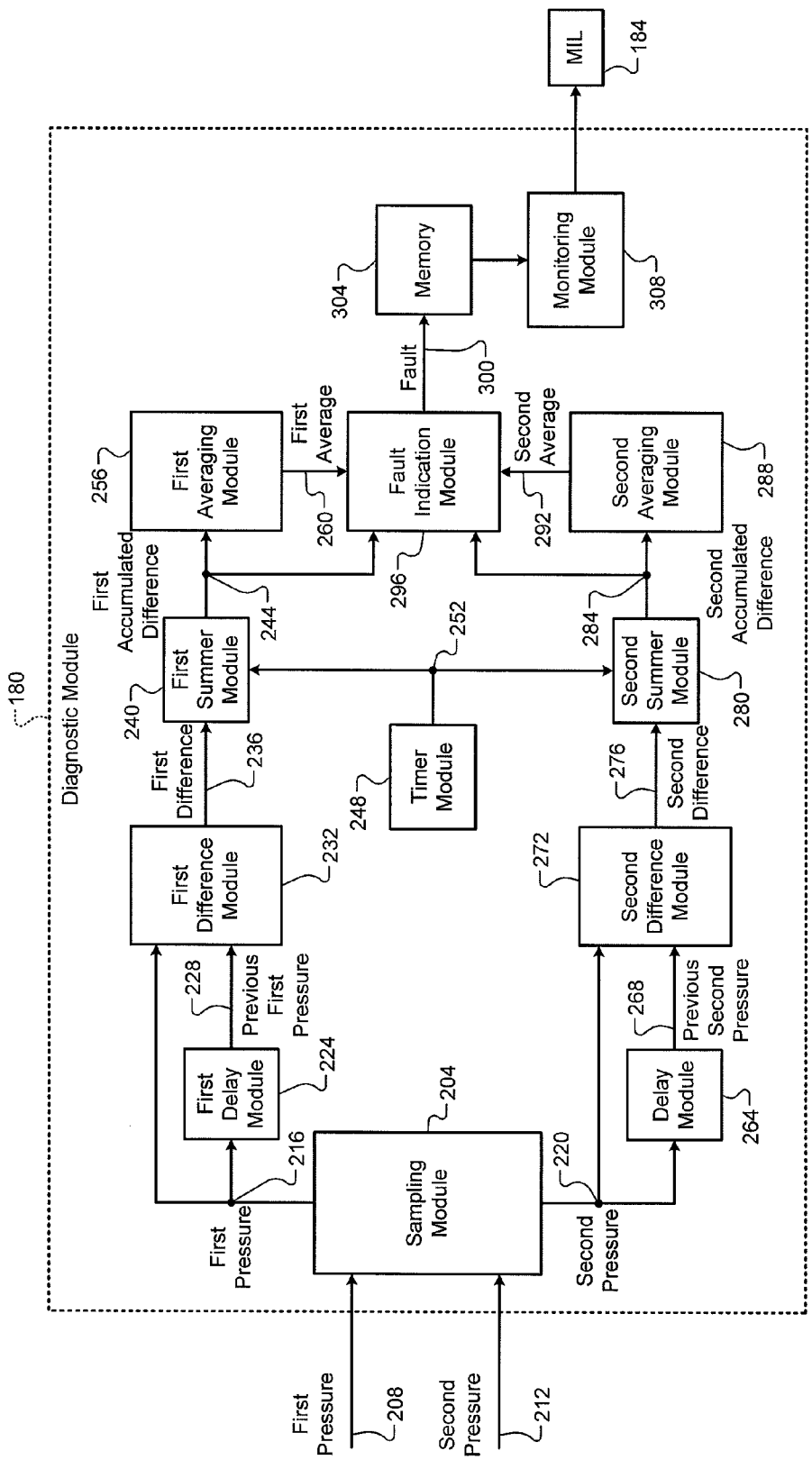
FIG. 2 is a functional block diagram of an example fault diagnostic module according to the present disclosure.

Referring now to FIG. 2, a functional block diagram of an example implementation of the diagnostic module 180 is presented. A sampling module 204 receives first and second pressure signals 208 and 212 from the first and second pressure sensors 160 and 164, respectively. The sampling module 204 samples the first and second pressure signals 208 and 212 at a predetermined sampling rate to produce first and second pressure samples 216 and 220, respectively. For example only, the predetermined sampling rate may be approximately once per 6.25 milliseconds (ms) or another suitable rate. The sampling module 204 may also filter, buffer, or perform one or more other signal processing functions to produce the first and second pressure samples 216 and 220.

A first delay module 224 receives the first pressure sample 216 and outputs a previous (e.g., last) value of the first pressure sample 216 as a previous first pressure 228. The previous first pressure 228 may therefore correspond to the last value of the first pressure sample 216. For example only, the first delay module 224 may include a one-unit, first-in-first-out (FIFO) buffer.

A first difference module 232 generates a first difference 236 based on a difference between the previous first pressure 228 and the first pressure sample 216. For example, the first difference module 232 may set the first difference 236 equal to an absolute value of a difference between the previous first pressure 228 and the first pressure sample 216.

A first summer module 240 generates a first accumulated difference 244 based on values of the first difference 236 generated during a predetermined period after startup of the engine 102. For example, the first summer module 240 may set the first accumulated difference 244 equal to a sum of the values of the first difference 236 generated during the predetermined period.

A timer module 248 may reset and start a timer value 252 when the first and second SAI valves 148 and 152 are commanded to open and the SAI pump 144 is commanded on after the startup of the engine 102. Values of the first difference 236 generated while the timer value 252 is between first and second predetermined values may be used to generate the first accumulated difference 244. Values of the first difference 236 generated when the timer value 252 is less than first predetermined value and when the timer value 252 is greater than the second predetermined value may be omitted from use in generating the first accumulated difference 244. In this manner, the first accumulated difference 244 may be set based on a sum of the values of the first difference 236 generated during the predetermined period between the first and second predetermined values. For example only, the first predetermined value may correspond to approximately 5 seconds or less or another suitable value, and the second predetermined value may correspond to approximately 20 seconds, approximately 25 seconds, or another suitable value. While use of a timer is shown and discussed, a number of samples/values may be counted and first and second predetermined number of samples may be used in various implementations.

A first averaging module 256 may generate a first average 260 based on the first accumulated difference 244. The first averaging module 256 may set the first average 260 equal to an average of the values of the first difference 236 generated during the predetermined period. For example, the first averaging module 256 may set the first average 260 equal to the first accumulated difference 244 divided by the number of values of the first difference 236 used in generating the first accumulated difference 244.

A second delay module 264 receives the second pressure sample 220 and outputs a previous (e.g., last) value of the second pressure sample 220 as a previous second pressure 268. The previous second pressure 268 may therefore correspond to the last value of the second pressure sample 220. For example only, the second delay module 264 may include a one-unit, FIFO buffer.

A second difference module 272 generates a second difference 276 based on a difference between the previous second pressure 268 and the second pressure sample 220. For example, the second difference module 272 may set the second difference 276 equal to an absolute value of a difference between the previous second pressure 268 and the second pressure sample 220.

A second summer module 280 generates a second accumulated difference 284 based on values of the second difference 276 generated during the predetermined period after the startup of the engine 102. For example, the second summer module 280 may set the second accumulated difference 284 equal to a sum of the values of the second difference 276 generated during the predetermined period between the first and second predetermined values.

A second averaging module 288 generates a second average 292 based on the second accumulated difference 284. The second averaging module 288 may set the second average 292 equal to an average of the values of the second difference 276 generated during the predetermined period. For example, the second averaging module 288 may set the second average 292 equal to the second accumulated difference 284 divided by the number of values of the second difference 276 used in generating the second accumulated difference 284.

A fault indication module 296 determines and indicates whether a leak or blockage is present downstream of (only) one of the first and second SAI valves 148 and 152. Leaks include leaks downstream of an SAI valve and disconnections of an SAI valve.

The fault indication module 296 may determine whether a leak or blockage is present based on the first average 260 and the second average 292. When a leak or blockage is present downstream of one of the first and second SAI valves 148 and 150, a difference between the first and second averages 260 and 292 may be measurable. When no leak or blockage is present downstream of the first and second SAI valves 148 and 150, the first and second averages 260 and 292 may be approximately equal.

For example, the fault indication module 296 may generate an average ratio based on the first and second averages 260 and 292 and determine whether a leak or blockage is present based on the average ratio. The fault indication module 296 may determine the average ratio, for example, using the equation:

$$\text{Average Ratio} = \frac{(\text{First Average} - \text{Second Average})}{\text{Max}(\text{First Average, Second Average})} + 1,$$

where Average Ratio is the average ratio, First Average is the first average 260, Second Average is the second average 292, and Max indicates use of the greater one of the first and second averages 260 and 292. The addition of 1 may ensure that the average ratio will be a positive value between 0 and 2 (instead of a signed value between −1 and +1), which may simplify further computations.

The fault indication module 296 may determine that a leak or blockage is present when the average ratio is less than 1 by at least a first predetermined amount or greater than 1 by a second predetermined amount. The fault indication module 296 may determine that no leak or blockage is present when the average ratio is within the first and second predetermined amounts of 1. In other words, the fault indication module 296 may determine that a leak or blockage is present when the average ratio is less than a fifth predetermined value that is less than 1 or greater than a sixth predetermined value that is greater than 1. The fault indication module may determine that no leak or blockage is present when the average ratio is between the fifth and sixth predetermined values.

Additionally or alternatively, the fault indication module 296 may determine whether a leak or blockage is present based on the first and second averages 260 and 292. The fault indication module 296 may determine whether a leak or blockage is present based on a difference between the first and second averages 260 and 292. For example, the fault indication module 296 may determine that a leak or blockage is present when the difference between the first and second averages 260 and 292 is less than a third predetermined value or greater than a fourth predetermined value. The fault indication module 296 may determine that no leak or blockage is present when the difference between the first and second averages 260 and 292 is between the third and fourth predetermined values. For example only, one of the third and fourth predetermined values may be greater than zero, and the other one of the third and fourth predetermined values may be less than zero.

Additionally or alternatively, the fault indication module 296 may determine whether a leak or blockage is present based on a comparison of a seventh predetermined value and an absolute value of the difference between the first and second averages 260 and 292. For example, the fault indication module 296 may determine that a leak or blockage is present when the absolute value of the difference between the first and second averages 260 and 292 is greater than the seventh predetermined value. The fault indication module 296 may determine that no leak or blockage is present when the absolute value of the difference between the first and second averages 260 and 292 is less than the seventh predetermined value.

The fault indication module 296 may generate a fault signal 300 to indicate whether a leak or blockage has been determined to be present. The fault indication module 296 may, for example, set the fault signal 300 to a first state when no leak or blockage is present. The fault indication module 296 may set the fault signal 300 to a second state when a leak or blockage is present. For example, the fault indication module 296 may set a predetermined diagnostic trouble code (DTC) in memory 304 when a leak or blockage is present. The predetermined DTC is associated with the presence of a leak or blockage downstream of one of the first and second SAI valves 148 and 152. Based on the association, a vehicle servicer can readily identify that a leak or blockage is present downstream of one of the first and second SAI valves 148 and 152.

A monitoring module 308 may monitor the memory 304. The monitoring module 308 may initiate one or more remedial actions when the fault indication module 296 indicates that a leak or blockage is present downstream of one of the first and second SAI valves 148 and 152. For example, the monitoring module 308 may illuminate the MIL 184 and/or take one or more other suitable remedial actions in response to the fault indication module 296 indicating that a leak or blockage is present downstream of one of the first and second SAI valves 148 and 152.

In various implementations, the fault indication module 296 may also determine and indicate whether the leak or blockage is present downstream of the first SAI valve 148 or whether the leak or blockage is present downstream of the second SAI valve 152. For example, in implementations involving two cylinder banks, the fault indication module 296 may determine that the leak or blockage is present downstream of the first SAI valve 148 when the average ratio is less than 1. The fault indication module 296 may determine that the leak or blockage is present downstream of the second SAI valve 152 when the average ratio is greater than 1. If the difference between the first and second averages 260 and 292 is used, the fault indication module 296 may determine that the leak or blockage is present downstream of the first SAI valve 148 when the first average 260 is less than the second average 292. The fault indication module 296 may determine that the leak or blockage is present downstream of the second SAI valve 152 when the second average 292 is less than the first average 260. In various implementations, the fault indication module 296 may generate separate fault signals (e.g., DTCs) indicating whether the leak or blockage is present downstream of the first SAI valve 148 or whether the leak or blockage is present downstream of the second SAI valve 152.

Figure 3:
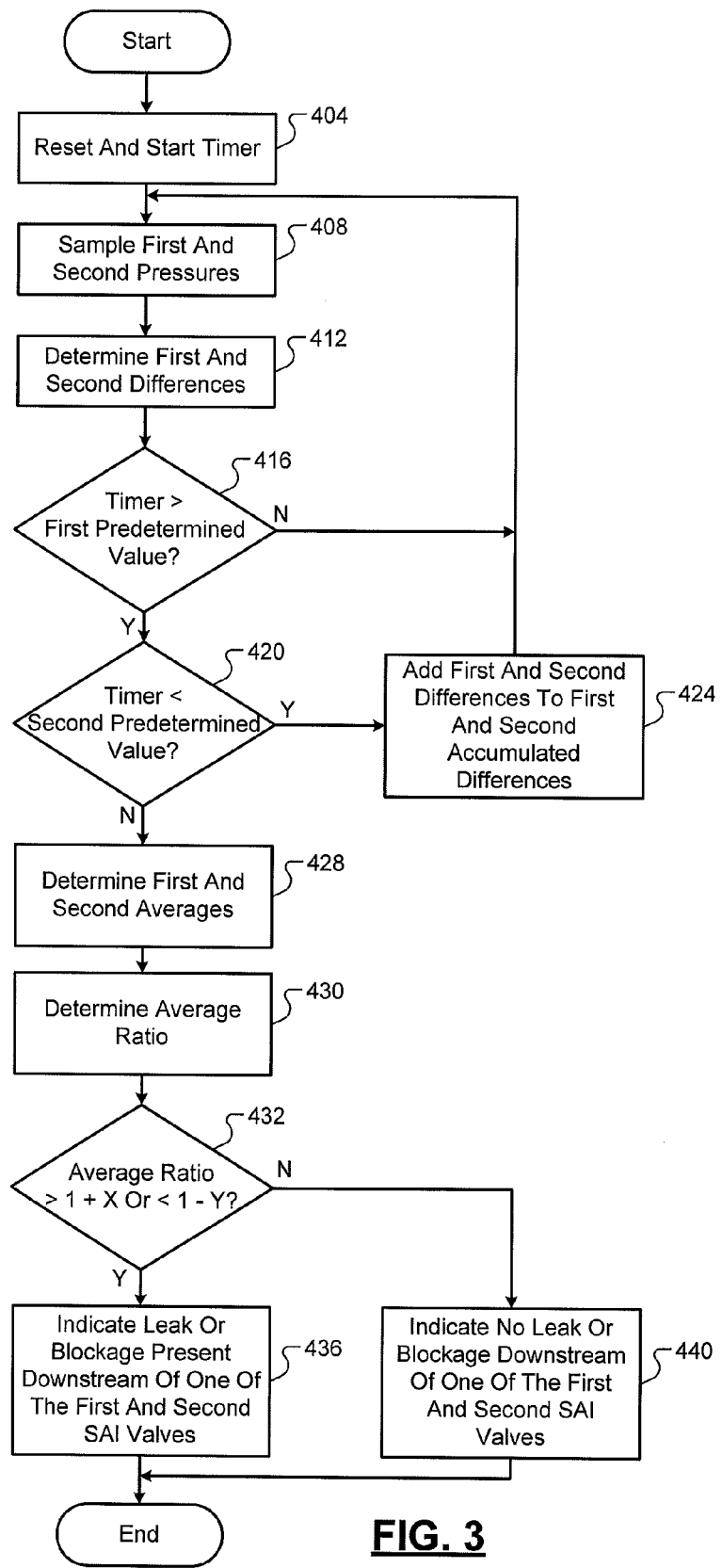
FIG. 3 is a flowchart depicting an example method of diagnosing whether a fault is present downstream of one of two SAI valves according to the present disclosure.

Referring now to FIG. 3, a flowchart depicting an example method of diagnosing a fault downstream of one of the first and second SAI valves 148 and 152 is presented. Control may begin with 404 when the first and second SAI valves 148 and 152 are commanded to open and the SAI pump 144 is commanded on after a startup (e.g., key ON) of the engine 102. At 404, the timer module 248 resets and starts the timer value 252.

At 408, the sampling module 204 samples the first and second pressure signals 208 and 212 and outputs the first and second pressure samples 216 and 220. The sampling module 204 samples the first and second pressure signals 208 and 212 at the predetermined sampling rate. The first and second delay modules 224 and 264 may also update the previous first and second pressures 228 and 268 at 408.

The first and second difference modules 232 and 272 determine the first and second differences 236 and 276 at 412. The first difference module 232 determines the first difference 236 based on a difference between the first pressure sample 216 and the previous first pressure 228. The second difference module 272 determines the second difference 276 based on a difference between the second pressure sample 220 and the previous second pressure 268. For example, the first and second difference modules 232 and 272 may set the first and second differences 236 and 276 equal to absolute values of the differences, respectively.

At 416, the first and second summer modules 240 and 280 may determine whether the timer value 252 is greater than the first predetermined value. If true, control may continue with 420. If false, the first and second differences 236 and 276 may not be added to the first and second accumulated differences 244 and 284, respectively, and control may return to 408.

At 420, the first and second summer modules 240 and 280 may determine whether the timer value 252 is less than the second predetermined value. If false, control may continue with 428. If true, the first and second summer modules 240 and 280 may add the first and second differences 236 and 276 to the first and second accumulated differences 244 and 284, respectively, at 424, and control may return to 408.

The first and second averaging modules 256 and 288 determine the first and second averages 260 and 292 based on the first and second accumulated differences 244 and 284, respectively, at 428. The first averaging module 256 may set the first average 260 equal to the first accumulated difference 244 divided by the number of values of the first difference 236 used to determine the first accumulated difference 244. The second averaging module 288 may set the second average 292 equal to the second accumulated difference 284 divided by the number of values of the second difference 276 used to determine the second accumulated difference 284.

At 430, the fault indication module 296 may determine the average ratio based on the first and second averages 260 and 292, as discussed above. While determination and use of the average ratio is discussed in conjunction with the example of FIG. 3, as stated above, the diagnosis of whether a leak or blockage is present downstream of one of the first and second SAI valves 148 and 152 may be made based on a comparison of the first and second averages 260 and 292 or an absolute value of a difference between the first and second averages 260 and 292.

The fault indication module 296 may determine whether the average ratio is less than 1 by at least the first predetermined amount or greater than 1 by at least the second predetermined amount at 432. If true, the fault indication module 296 may determine and indicate that a leak or blockage is present downstream of one of the first and second SAI valves 148 and 152 at 436. One or more remedial actions, such as illuminating the MIL 184 and/or one or more other suitable remedial actions may be taken in response to the indication that a leak or blockage is present. If false, the fault indication module 296 may determine and indicate that no leak or blockage is present downstream of one of the first and second SAI valves 148 and 152 at 440. Control may end after 436 or 440. While control is shown and discussed as ending, FIG. 3 may be illustrative of one control loop and control loops may be performed periodically, such as once per key cycle of the vehicle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A diagnostic system for a vehicle, comprising:
 a first electronic circuit that generates a first difference based on a first pressure measured at a first secondary air injection (SAI) valve and a previous value of the first pressure;
 a second electronic circuit that generates a first accumulated difference based on a sum of values of the first difference generated during a predetermined period;
 a third electronic circuit that generates a first average of the values of the first difference generated during the predetermined period based on the first accumulated difference;
 a fourth electronic circuit that generates a second difference based on a second pressure measured at a second SAI valve and a previous value of the second pressure;
 a fifth electronic circuit that generates a second accumulated difference based on a sum of values of the second difference generated during the predetermined period;
 a sixth electronic circuit that generates a second average of the values of the second difference generated during the predetermined period based on the second accumulated difference;
 a seventh electronic circuit that selectively indicates that a fault is present downstream of one of the first and second SAI valves based on a difference between the first and second averages; and
 an eighth electronic circuit that illuminates a malfunction indicator lamp when the seventh electronic circuit indicates that the fault is present.

2. The diagnostic system of claim 1 wherein the seventh electronic circuit selectively indicates that the fault is present based on the difference between the first and second averages divided by a greater one of the first and second averages.

3. The diagnostic system of claim 1 wherein the seventh electronic circuit selectively indicates that the fault is present based on a first value that is equal to one plus a second value that is equal to the difference between the first and second averages divided by a greater one of the first and second averages.

4. The diagnostic system of claim 3 wherein the seventh electronic circuit indicates that the fault is present when one of: (i) the first value is less than a third value equal to one minus a first predetermined amount; and (ii) the first value is greater than a fourth value equal to one plus a second predetermined value.

5. The diagnostic system of claim 4 wherein the seventh electronic circuit indicates that the fault is not present when the first value is between the third and fourth values.

6. The diagnostic system of claim 1 wherein the seventh electronic circuit selectively indicates that the fault is present based on an absolute value of a difference between the first and second averages.

7. A system comprising:
 the diagnostic system of claim 1;
 the first and second SAI valves; and
 a SAI pump that pumps ambient air into an exhaust system of an engine via the first and second SAI valves.

8. The diagnostic system of claim 1 wherein the first, second, third, fourth, fifth, sixth, seventh, and eighth electronic circuits include or are a part of at least one of: an Application Specific Integrated circuit (ASIC); a digital integrated circuit; an analog integrated circuit; a mixed analog/digital integrated circuit; a combinational logic circuit; a field programmable gate array (FPGA); and a processor and memory including code.

9. A diagnostic method for a vehicle, comprising:
 generating a first difference based on a first pressure measured at a first secondary air injection (SAI) valve and a previous value of the first pressure;
 generating a first accumulated difference based on a sum of values of the first difference generated during a predetermined period;
 generating a first average of the values of the first difference generated during the predetermined period based on the first accumulated difference;
 generating a second difference based on a second pressure measured at a second SAI valve and a previous value of the second pressure;
 generating a second accumulated difference based on a sum of values of the second difference generated during the predetermined period;
 generating a second average of the values of the second difference generated during the predetermined period based on the second accumulated difference;
 selectively indicating that a fault is present downstream of one of the first and second SAI valves based on a difference between the first and second averages; and
 illuminating a malfunction indicator lamp in response to the indication that the fault is present.

10. The diagnostic method of claim 9 further comprising selectively indicating that the fault is present based on the difference between the first and second averages divided by a greater one of the first and second averages.

11. The diagnostic method of claim 9 further comprising selectively indicating that the fault is present based on a first value that is equal to one plus a second value that is equal to the difference between the first and second averages divided by a greater one of the first and second averages.

12. The diagnostic method of claim 11 further comprising indicating that the fault is present when one of: (i) the first value is less than a third value equal to one minus a first predetermined amount; and (ii) the first value is greater than a fourth value equal to one plus a second predetermined value.

13. The diagnostic method of claim 12 further comprising indicating that the fault is not present when the first value is between the third and fourth values.

14. The diagnostic method of claim 9 further comprising selectively indicating that the fault is present based on an absolute value of a difference between the first and second averages.

15. The diagnostic method of claim 9 further comprising triggering an SAI pump to pump ambient air into an exhaust system of an engine via the first and second SAI valves.

\* \* \* \* \*